United States Patent [19]

Usui

[11] 4,256,680
[45] Mar. 17, 1981

[54] METHOD AND APPARATUS FOR PRODUCING REINFORCED SYNTHETIC RESIN PIPE

[76] Inventor: Fumio Usui, 441, Shimofusa, Tama-ku, Kawasaki-shi, Kanagawa-ken, Japan

[21] Appl. No.: 967,894

[22] Filed: Dec. 11, 1978

[30] Foreign Application Priority Data

Aug. 25, 1978 [JP] Japan .................................. 53-103504
Aug. 25, 1978 [JP] Japan .................................. 53-103505
Aug. 25, 1978 [JP] Japan .................................. 53-103506

[51] Int. Cl.³ ........................ B29C 27/28; B28B 1/08
[52] U.S. Cl. ...................................... 264/71; 264/103; 264/257; 264/334; 425/125; 425/426; 425/432
[58] Field of Search .......... 264/71, 103, 257, 258, 334; 425/125, 426, 432

[56] References Cited

U.S. PATENT DOCUMENTS

| | | | |
|---|---|---|---|
| 2,199,197 | 4/1940 | Gatke | 264/103 X |
| 2,602,766 | 7/1952 | Francis | 264/347 X |
| 2,633,605 | 4/1953 | Brucker | 264/257 |
| 2,785,442 | 3/1957 | Boggs | 264/311 X |
| 3,037,244 | 6/1962 | Boggs | 249/83 X |
| 3,093,160 | 6/1963 | Boggs | 264/103 X |
| 3,238,280 | 3/1966 | Gray et al. | 264/103 |
| 3,495,494 | 2/1970 | Scott | 264/257 X |
| 3,592,884 | 7/1971 | Williams | 264/46.9 X |
| 3,617,593 | 11/1971 | Alderfer | 264/257 X |
| 3,628,938 | 12/1971 | Kozmin | 264/71 X |
| 3,770,859 | 11/1973 | Bevan | 264/71 |
| 3,795,725 | 3/1974 | Bulin | 264/71 |
| 3,856,054 | 12/1974 | Steinberg et al. | 264/71 X |
| 3,975,479 | 8/1976 | McClean | 264/257 X |
| 3,976,902 | 8/1976 | Simmonds | 264/71 X |
| 4,002,715 | 1/1977 | Usui | 264/257 X |
| 4,012,824 | 3/1977 | Dawihl et al. | 264/257 X |
| 4,144,632 | 3/1979 | Stroupe | 264/257 X |

FOREIGN PATENT DOCUMENTS

1173762 12/1969 United Kingdom ..................... 264/257

Primary Examiner—Philip Anderson
Attorney, Agent, or Firm—Wenderoth, Lind & Ponack

[57] ABSTRACT

A reinforced synthetic resin pipe is produced by winding a reinforcing material about a core bar suspended vertically for preforming the pipe, inserting the core bar holding thereabout the preformed reinforcing material into a mold into which a predetermined quantity of the liquid synthetic resin has been poured, pressing the core bar into the mold while applying vibration to the core bar or to the mold, stripping the core bar from the mold after the synthetic resin has been hardened, and separating the hardened molding from the core bar or the mold.

15 Claims, 31 Drawing Figures

Fig. I

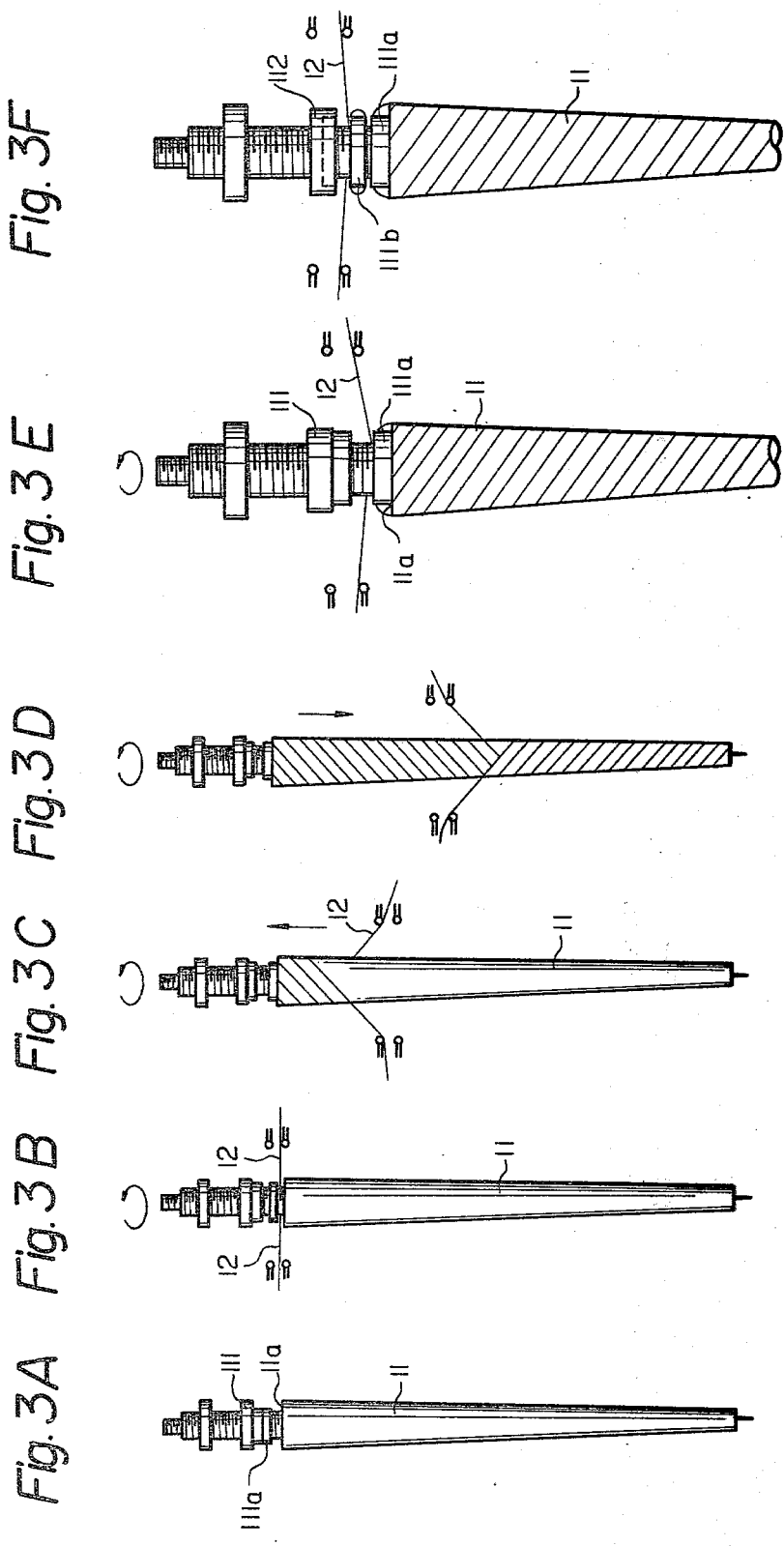

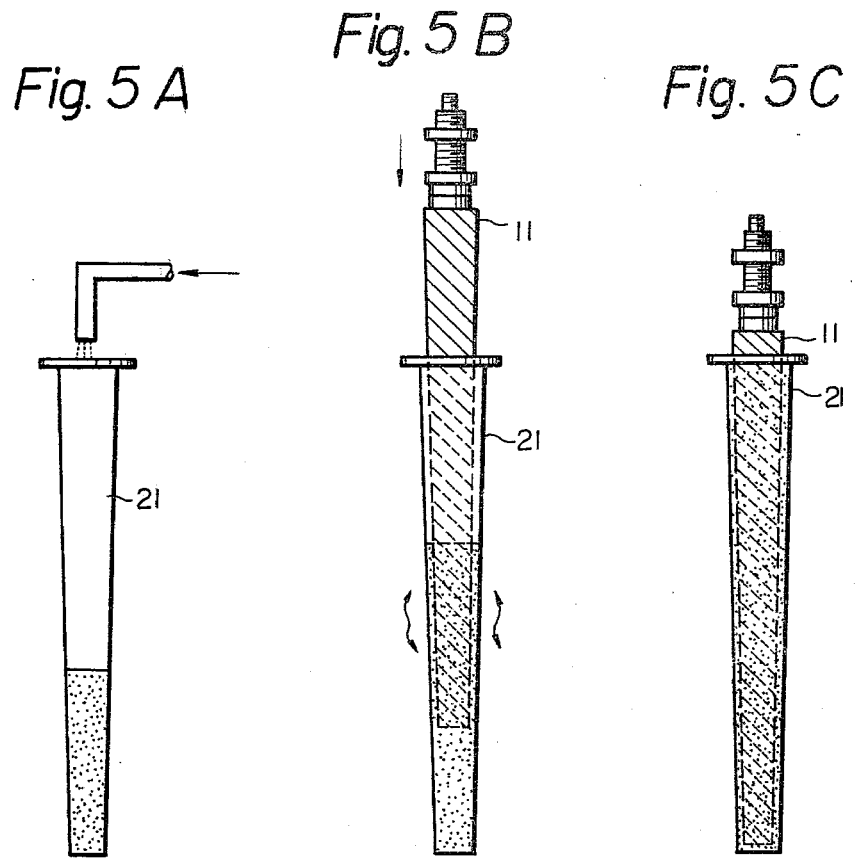
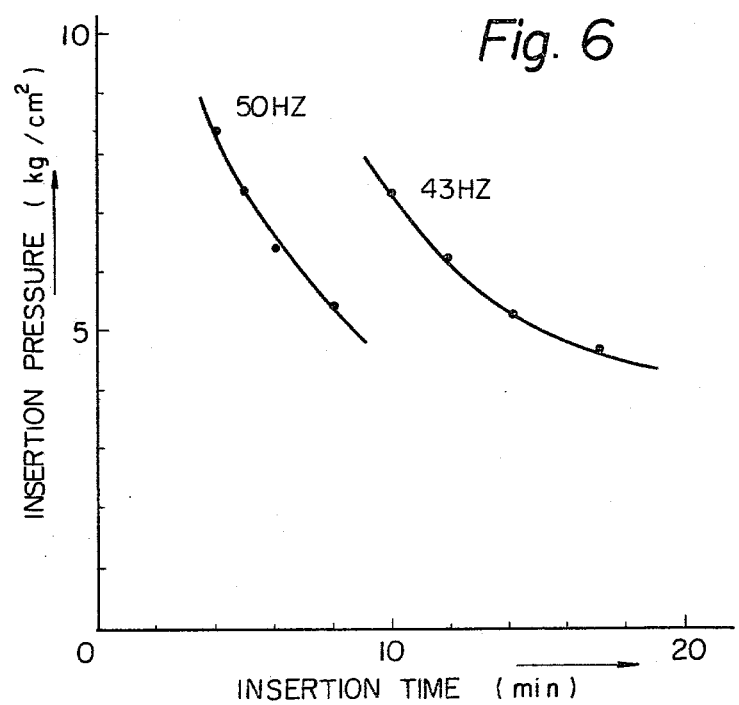

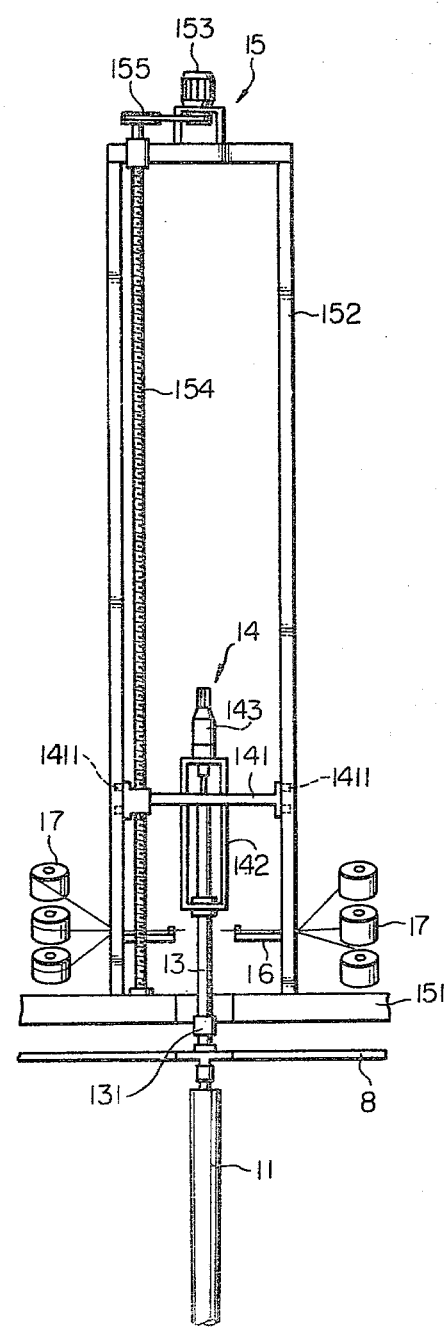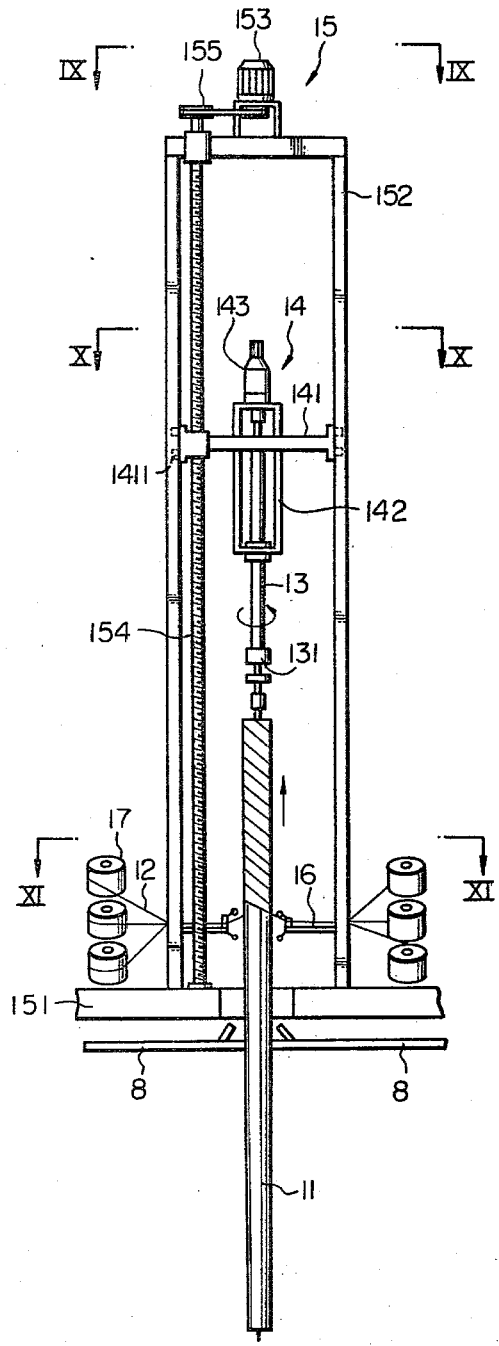
Fig. 7
Fig. 8

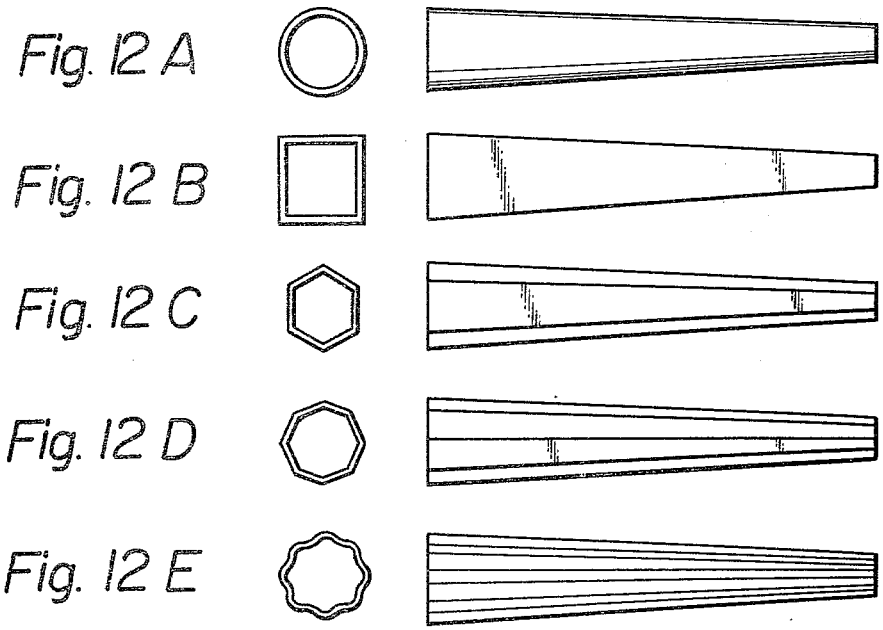
Fig. 12 A
Fig. 12 B
Fig. 12 C
Fig. 12 D
Fig. 12 E
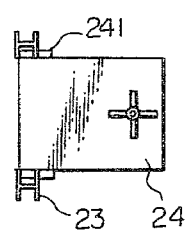
Fig. 15
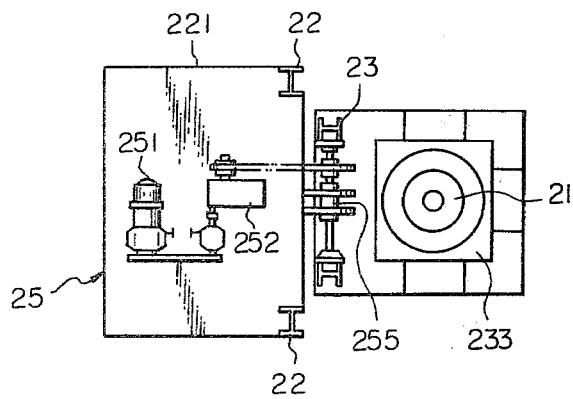
Fig. 16
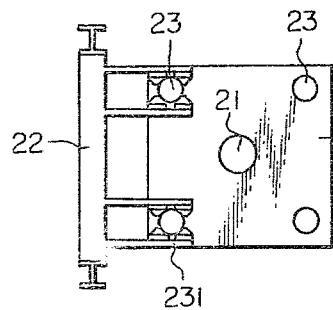
Fig. 17

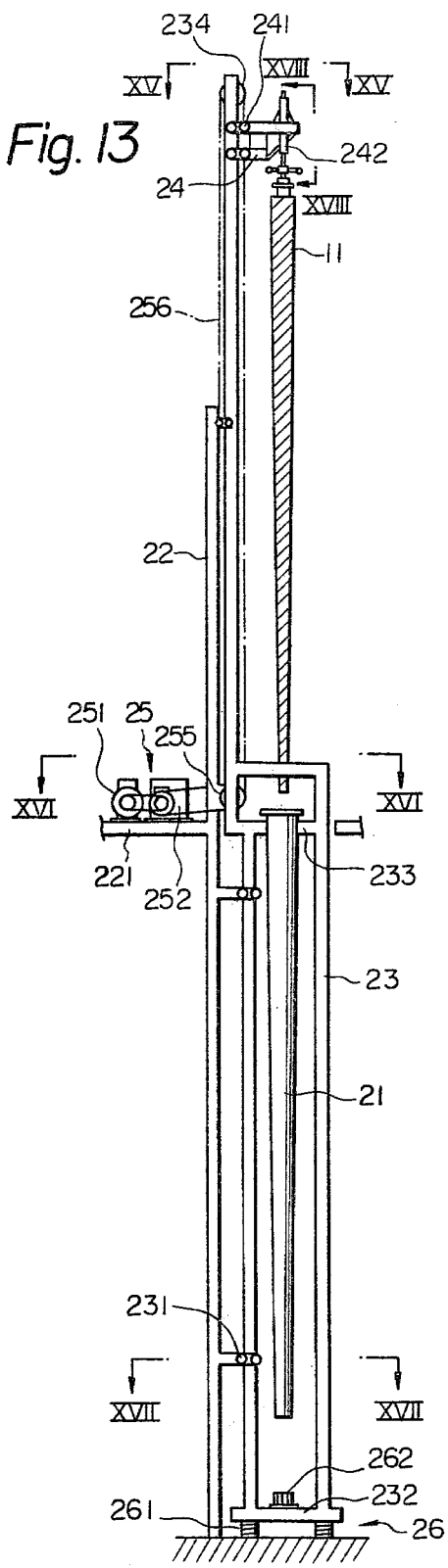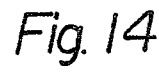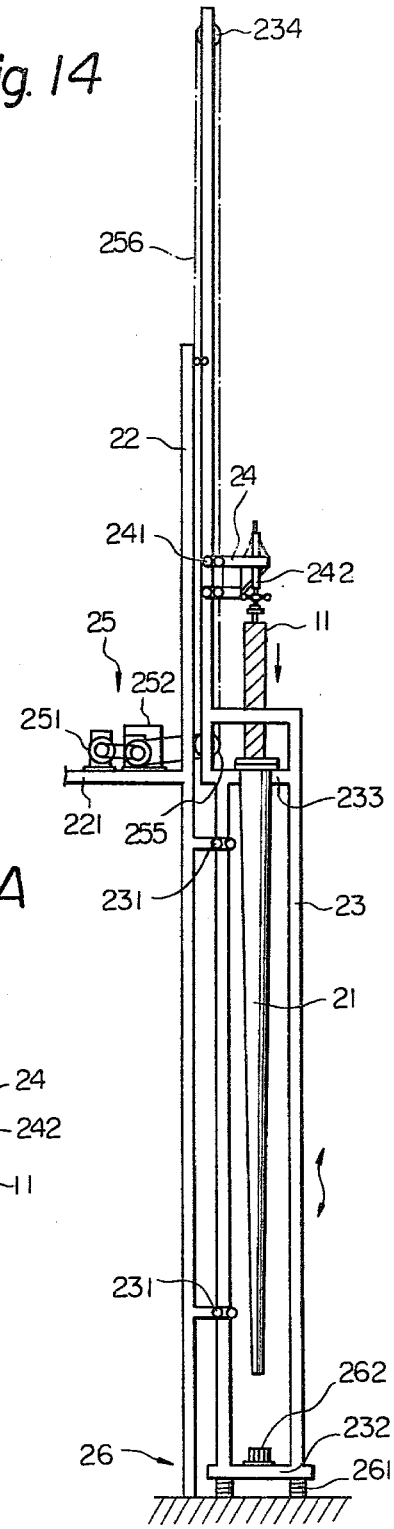

METHOD AND APPARATUS FOR PRODUCING REINFORCED SYNTHETIC RESIN PIPE

BACKGROUND OF THE INVENTION

The present invention relates to a method and an apparatus for producing a reinforced synthetic resin pipe, and more particularly, to a method and an apparatus for producing a synthetic resin pipe reinforced by fiber material, wire material or combination thereof.

Conventionally, reinforced synthetic resin pipes have been produced by winding glass fibers containing synthetic resin in a semi-solid state around a horizontally held core bar in multi-layers and allowing them to harden. However, this method has a disadvantage that in producing long pipes of relatively small diameters the core bar tends to curve to thereby make the preforming operation difficult. Therefore, the conventional method imposes certain limitations on the size of the products.

Accordingly, an object of the present invention is to provide an economical method for producing reinforced synthetic resin pipes of high quality in a wide range of sizes.

Another object of the present invention is to provide an apparatus for economically producing reinforced synthetic resin pipes of high quality in a wide range of sizes.

A further object of the present invention is to provide a reinforcing material preforming machine capable of economically producing reinforced synthetic resin pipes of high quality in a wide range of sizes.

A still further object of the present invention is to provide an apparatus for economically producing reinforced synthetic resin pipes of high quality in a wide range of sizes and which is particularly capable of uniformly and efficiently impregnating the preformed reinforcing material with a liquid synthetic resin.

SUMMARY OF THE INVENTION

The method and the apparatus according to the present invention obtain a reinforced synthetic resin pipe by winding fiber material, wire material or combination thereof (hereinafter referred to as reinforcing material) about a vertically suspended core bar for preforming the pipe inserting the core bar having the preformed reinforcing material thereabout into a mold into which a predetermined quantity of the liquid synthetic resin has been poured, pressing the core bar into the mold while applying vibration to the core bar or to the mold from the beginning of the insertion or after a predetermined length of the core bar has been inserted into the mold, allowing the synthetic resin to harden, stripping the core bar from the mold, and separating the hardened molding of the reinforced synthetic resin from the core bar or the mold.

The preforming machine in the apparatus according to the present invention comprises a core bar, a holder for suspending and holding the core bar vertically, a rotary driving mechanism for rotating the holder, a mechanism for driving the holder and the rotary driving mechanism vertically upwardly and downwardly as a unit, and a reinforcing material feed guide.

While the preforming machine in the apparatus according to the present invention achieves excellent results when used in the method for producing a reinforced synthetic resin pipe according to the present invention, the machine can be satisfactorily utilized for producing a common reinforced synthetic resin pipe.

The vibrating and pressing machine in the apparatus according to the present invention is constructed to insert the core bar having the preformed reinforcing material thereabout into the mold into which the liquid synthetic resin has been poured and to press the core bar further into the mold while applying vibration to the core bar or to the mold.

While the vibrating and pressing machine in the apparatus according to the present invention achieves excellent results when used in the method for producing a reinforced synthetic resin pipe according to the present invention, the machine can be satisfactorily employed for impregnating a conventionally preformed molding with synthetic resin.

BRIEF DESCRIPTION OF THE DRAWINGS

The invention will be better understood from the following description taken in connection with the accompanying drawings in which:

FIGS. 3A to 3F are schematic illustrations of the preforming steps;

FIGS. 5A to 5C are fragmentary enlarged views of a part of the steps shown in FIG. 1;

FIG. 6 is a graph showing the tendency of the vibrating and pressing effect according to the present invention;

FIG. 7 is a front view of the preforming machine according to the present invention;

FIG. 8 is a front view similar to FIG. 7, showing the machine in another operating condition;

FIGS. 12A to 12E are schematic front and plan views of various shapes of reinforced synthetic resin pipes according to the present inventions;

FIG. 13 is a front view of the vibrating and pressing machine according to the present invention;

FIG. 14 is a front view similar to FIG. 13, showing the machine in another operating condition;

FIG. 14A shows another embodiment of the movable platform;

FIG. 15 is a top view taken along the line XV—XV of FIG. 13;

FIG. 16 is a cross-sectional view taken along the line XVI—XVI of FIG. 13;

FIG. 17 is a cross-sectional view taken along the line XVII—XVII of FIG. 13.

DESCRIPTION OF THE PREFERRED EMBODIMENTS

The method and the apparatus according to the present invention will be described hereunder with reference to the accompanying drawings.

Figure 1:
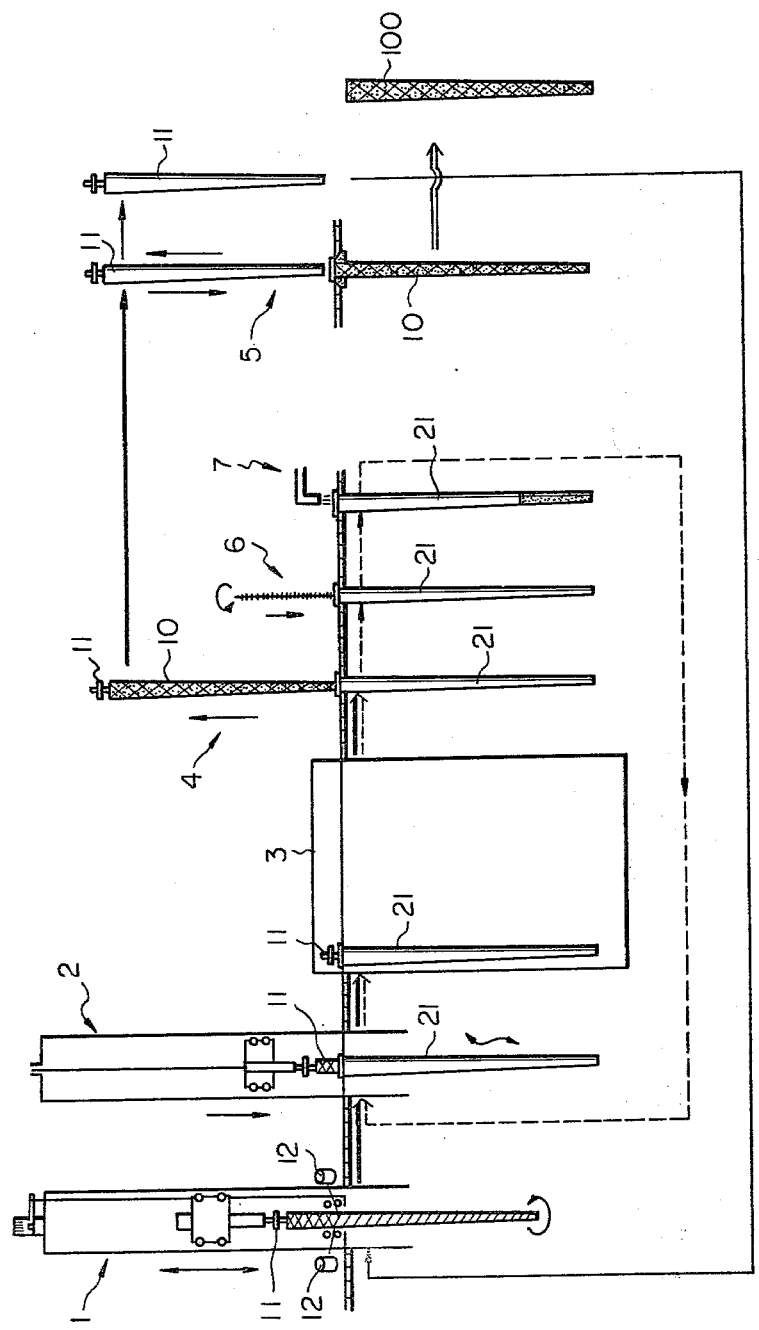
FIG. 1 is a schematic illustration of the steps of the method for producing a reinforced synthetic resin pipe according to the present invention.
Figure 2:
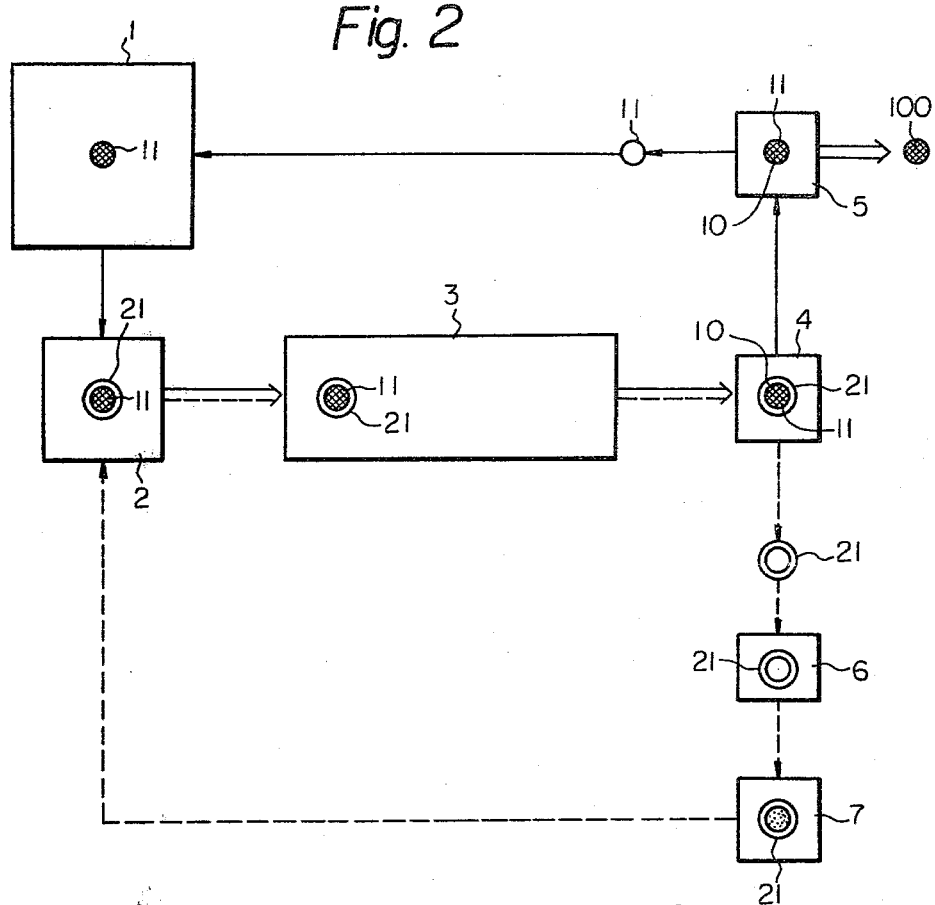
FIG. 2 is a schematic plan view of the steps of FIG. 1.

FIGS. 1 and 2 are side and front views, respectively, schematically illustrating a series of steps and an apparatus for practicing the method according to the present invention. Although tapered pipes of reinforced synthetic resin are shown in the drawings for convenience' sake, it will be understood that the method and the apparatus according to the present invention can be used for producing common straight pipes without taper.

Firstly in a preforming step 1, a reinforcing material 12 is preformed. In this preforming step 1, a core bar 11 is suspended vertically and has wound thereon a plurality of layers of the reinforcing material 12 while moving the core bar 11 vertically upward and downward. A detailed description of the preforming step will be given with reference to FIGS. 3 and 4.

The core bar 11 having the preformed reinforcing material thereon is transferred to a vibrating and pressing step 2 in which the core bar 11 having the preformed reinforcing material thereon is inserted into a vertically supported mold 21 into which a predetermined quantity of a liquid synthetic resin has been poured. The core bar 11 is pressed into the mold 21 while applying vibration to the core bar 11 or to the mold 21 from the beginning of the insertion or after a predetermined length of the core bar has been inserted into the mold. During this vibrating and pressing step the liquid synthetic resin is uniformly impregnated into the preformed reinforcing material. Further, air bubbles formed during the inserting and pressing operation are eliminated by the vibration. A detailed description of the vibrating and pressing step will be given with reference to FIGS. 5 and 6.

Then, the core bar 11 and the mold 21 are transferred as a unit to a hardening step 3 in which they are heated at a predetermined temperature for a predetermined length of time. During this hardening step the preformed reinforced material impregnated with the synthetic resin is hardened and molded.

After the hardening step, the core bar 11 and the mold 21 are separated from each other in a stripping step 4. At this time, the hardened molding 10 usually remains attached to the core bar 11 or, occasionally, attached to the inside of the mold 21.

The molding 10 attached to the core bar 11 or inside the mold 21 is separated therefrom in a separating step 5. The molding 10 is transferred to a conventional finishing step (not shown) in which it is finished into a product such as a reinforced synthetic resin pipe 100. On the other hand, the core bar 11 pulled out of the molding 10 is washed, coated with a mold release agent, and returned to the preforming step 1 described above.

The mold 21 from which the inserted materials have been completely removed during the stripping or the separating step is washed in a washing step 6, coated with a mold release agent, and transferred to a synthetic resin pouring step 7. The mold 21 into which a predetermined quantity of the liquid synthetic resin is poured in the pouring step 7 is returned to the vibrating and pressing step 2 described above.

The preforming step 1 will now be described in detail with reference to FIGS. 1, 3 and 4. A preforming machine is satisfactory if it comprises a core bar, a holder for suspending and holding the core bar vertically, a mechanism for rotating the holder, and a mechanism for moving the holder and the rotating mechanism vertically upwardly and downwardly. A most preferred embodiment of the preforming machine will be described in detail hereinafter with reference to FIGS. 7 to 11. The core bar may be a straight or tapered bar having a circular or polygonal section or a combination thereof depending upon the configuration of the required product (see FIGS. 12A to 12E). On the threaded top of the core bar are threadably fitted a plurality of rings 111 for holding the leading and the trailing ends of the reinforcing material, respectively.

At first, as shown in FIG. 3A, a suitable interval is provided between the shoulder 11a of the core bar 11 and the lowest ring 111a. The leading end of the reinforcing material 12 to be wound is guided into said interval and is fastened there by tightening the ring 111a (see FIG. 3B). Then, the core bar 11 is moved upward at a predetermined speed while being rotated in a predetermined direction (see FIG. 3C). During this rotating upward movement, the core bar 11 has wound thereabout with the reinforcing material 12.

Figures 4A, 4B:
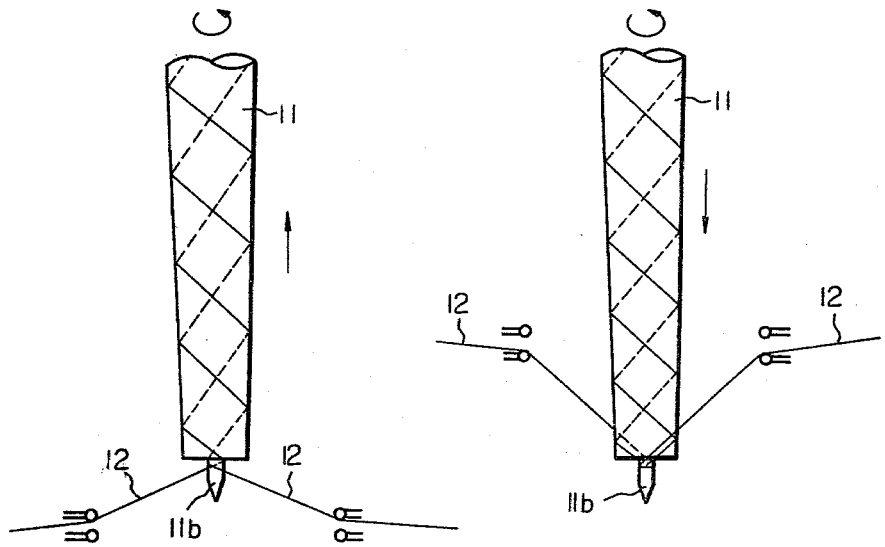
FIGS. 4A and 4B are fragmentary enlarged views of a part of the steps shown in FIG. 3.

When the core bar 11 has been moved to the upper limit, the reinforcing material 12 is wound about a projection 11b at the lowest end of the core bar 11 as shown in FIG. 4A. Then, while continuing the rotation, the core bar 11 is moved downward at the predetermined speed to continuously wind the reinforcing material 12 about the core bar 11 from the lowest end thereof. With the continued downward movement of the core bar 11 at the predetermined speed, the reinforcing material 12 is wound as a second layer at a reversed leading angle on the reinforcing material 12 previously wound as the first layer (see FIG. 3D).

When the core bar 11 has been moved to the lower limit, the reinforcing material 12 is wound about the shoulder 11a of the core bar 11 or about the upper edge of the ring 111a as shown in FIG. 3E. At this time the core bar 11 is moved upward again to continue the winding operation as shown in FIG. 3C. By repeating the upward and downward movements of the core bar 11 a suitable number of times as described above the preforming of the reinforcing material in the desired thickness is accomplished.

Lastly, as shown in FIG. 3F, the reinforcing material 12 is held between the rings 111a and 111b and cut by a cutter 112. The trailing end of the reinforcing material wound about the core bar 11 remains caught between the rings 111a and 111b.

To summarize, the preforming of the reinforcing material according to the present invention is accomplished by arbitrarily selecting the number of times and the speed of upward and downward movement of the core bar and the speed of rotation thereof.

The vibrating and pressing step will now be described in detail with reference to FIGS. 1, 5 and 6.

Firstly a predetermined quantity of the liquid synthetic resin is poured into the mold (see FIG. 5A) in the synthetic resin pouring step 7 described hereinabove with reference to FIG. 1. The quantity of the synthetic resin to be poured depends on the size of the intended product. The synthetic resin to be used is preferably thermosetting resin such, for example, as unsaturated polyester resin, epoxy resin, phenol-formaldehyde resin, and polyimide resin.

Any vibrating and pressing machine is suitable for use in the present invention if it can carry out the functions of inserting the core bar 11 holding thereabout the preformed reinforcing material into the mold 12 into which the liquid synthetic resin has been poured, and applying vibration to the core bar 11 or to the mold 21. A most preferred embodiment of the vibrating and pressing machine will be described hereinbelow in detail with reference to FIGS. 13 to 18.

Usually, the core bar 11 is inserted smoothly into the mold 21 until the lower end thereof reaches the surface of the liquid synthetic resin poured in the mold 21. Thereafter, however, the insertion of the core bar 11 with the normal pressing load becomes increasingly difficult due to increasing resistance due to the buoyancy and viscosity of the liquid synthetic resin.

In the method according to the present invention, therefore, vibration is applied to the core bar 11 or to the mold 21 when the core bar is inserted or pressed into the mold to thereby enable the core bar 11 to be inserted into the mold 21 smoothly and fully as shown in FIG. 5C.

The optimum ranges of the frequency and the amplitude of vibration to be applied and the insertion pressure can be obtained from a number of experiments. Longitudinal vibration with respect to the axis of the core bar or the mold is more effective for the purpose than the transverse vibration. If the insertion time (min.) and the insertion pressure (Kg/cm$^2$) of the core bar are taken on the X and Y axes, respectively, the vibrating pressing effect shows a tendency to become a hyperbola with the X and Y axes as the asymptotes as shown in FIG. 6. Further, it is expected that the eccentricity of the hyperbola is smallest when the frequency of vibration and the amplitude are in the optimum range, becomes greater as the frequency of vibration and the amplitude move away from said optimum range, and becomes greatest when no vibration is applied at all.

To summarize, the vibrating pressing effect not only accomplishes reduction in the insertion pressure and in the insertion time of the core bar but also accelerates uniform impregnation of the synthetic resin by the bubble eliminating function.

A hardening oven for use in the hardening step 3 is satisfactory if it functions to vertically suspend the core bar and the mold as a unit in the oven and transfers them.

A stripper for stripping the core bar 11 from the mold 21 and a separator for separating the molding 10 from the core bar 11 can be a conventional mechanism. Particularly in cases of tapered pipes as shown in the drawings, the stripping and the separating operations are much easier than for straight pipes, being accomplished by reversing the vibrating and pressing machine as will be described hereinbelow in more detail.

The washing step 6, the synthetic resin pouring step 7 and the finishing step can utilize common conventional methods and, accordingly, there will be no need to describe these steps in detail.

The preforming machine according to the present invention will now be described with reference to FIGS. 7 to 11. The preforming machine according to the present invention comprises the core bar 11, a holder 13 for vertically suspending and holding the core bar 11, a rotary driving mechanism 14 for rotating the holder 13, an upward and downward driving mechanism 15 for driving the holder 13 and the rotary driving mechanism 14 vertically upwardly and downwardly as a unit, and a feed guide 16 for guiding the reinforcing material.

Figure 9:
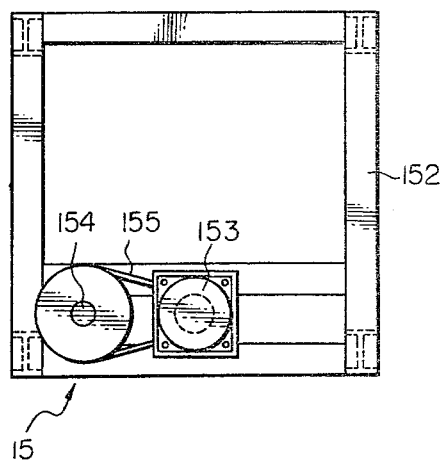
FIG. 9 is a top view taken along the line IX—IX of FIG. 8.

The upward and downward driving mechanism 15 comprises a frame 152 erected vertically on a floor 151, an electric motor 153 fixed on the top of the frame 152, a threaded shaft 154 supported vertically by the frame 152, and suitable connecting means 155, such as sprocket and chain or pulley and V-belt, for connecting the electric motor 153 and the threaded shaft 154 (see FIG. 9).

Figure 10:
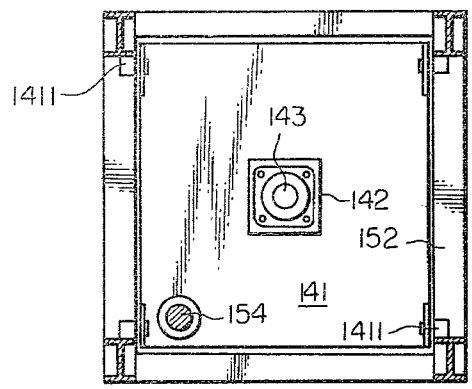
FIG. 10 is a cross-sectional view taken along the line X—X of FIG. 8.

The rotary driving mechanism 14 comprises a movable platform 141 horizontally movably supported by the frame 152 and threadably engaged by the threaded shaft 154, a support frame 142 fixed vertically to the movable platform 141, and an electric motor 143 fixed on the top of the support frame 142 (see FIG. 10). The movable platform 141 is preferably provided with wheels 1411 to facilitate the movement of the platform 141.

The holder 13 is vertically and rotatably supported by the support frame 142 with the upper end thereof connected directly to the electric motor 143 and the lower end thereof holding the upper end of the core bar 11 through a suitable chuck 131.

Figure 11:
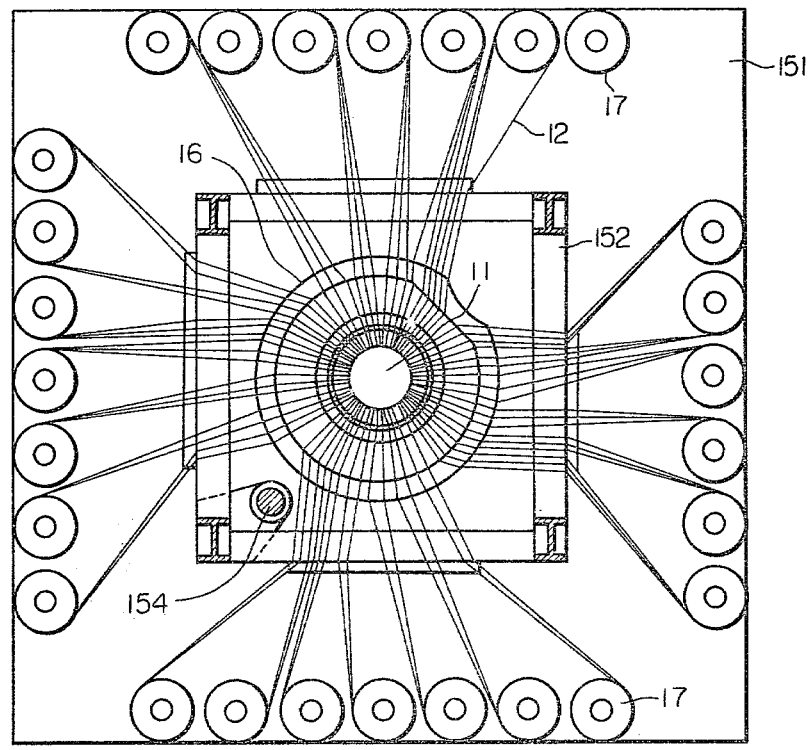
FIG. 11 is a cross-sectional view taken along the line XI—XI of FIG. 8.

The feed guide 16 is provided at the lower end of the frame 152, for pulling out the reinforcing material 12 wound about a plurality of reels 17 and for winding the material about the core bar 11 (see FIG. 11). The reinforcing material winding operation will be described hereinunder in more detail.

When the core bar 11 suspended by a conveyor 8 is transferred thereby to a predetermined position directly below the preforming machine and stops as shown in FIG. 7, the electric motor 153 is actuated to move the platform 141 downward. With this downward movement of the platform 141, the holder 13 moves downward to cause the chuck 131 at the end thereof to engage and hold securely the upper end of the core bar 11. Then, the electric motor 153 is reversed to move the platform 141 upward. When the core bar 11 is moved upward to the predetermined position, the electric motor 153 is stopped. At this time, the leading end of the reinforcing material 12 is fixed to the upper end of the core bar as will be described hereinunder in fuller detail.

Then, the electric motors 143 and 153 are actuated simultaneously to move the core bar 11 upward while rotating it in a predetermined direction as shown in FIG. 8. As will be described hereinunder, the core bar 11 is repeatedly moved upward and downward as required.

For releasing the core bar 11, the operational steps described above are carried out in the reverse order. Namely, the core bar 11 is moved downward to its lowest position and transferred onto the conveyor 8, and then released from the the chuck 131.

As shown in FIGS. 13 to 18, the vibrating and pressing machine according to the present invention comprises a stationary vertical support 22, a movable vertical support 23, a movable platform 24, an upward and downward driving mechanism 25, and a vibrating mechanism 26.

As best shown in FIGS. 13 and 17, the movable vertical support 23 is movably supported on the stationary vertical support 22 on suitable rollers 231 and is provided at the lower end thereof with the vibrating mechanism 26. The vibrating mechanism 26 comprises a resilient support member 261 consisting of springs, fluid cylinders or the like, and a vibrating machine 262. The resilient support member 261 supports the movable vertical support 23 at the lower end thereof, and the vibrating machine 262 is fixed on a base plate 232 provided at the lower end of the movable vertical support 23. Since the vibrating machine 262 is intended to vibrate the core bar 11 or the mold 21 relative to each other, the vibrating machine 262 may be fixed on the movable platform 24 as shown in FIG. 14A.

The movable vertical support 23 is provided at a middle portion thereof with a support plate 233 for supporting the mold 21. At the upper end of the support 23 is movably provided the movable platform 24 on suitable rollers 241 (see FIG. 15).

As best shown in FIGS. 13 and 16, the stationary vertical support 22 is provided at a middle portion thereof with a support plate 221 on which the upward and downward driving mechanism 25 is fixed. The upward and downward driving mechanism 25 comprises an electric motor 251, a speed changer 252 connected directly to the electric motor 251, and a sprocket 255 connected directly to the speed changer 252. The sprocket 255 has wound thereabout a chain 256 which is paid out through a suitable guide roller and is fixed at an intermediate portion thereof to the movable platform 24. The chain 256 further extends around an idle roller 234 and returns to the sprocket 255.

Figure 18:
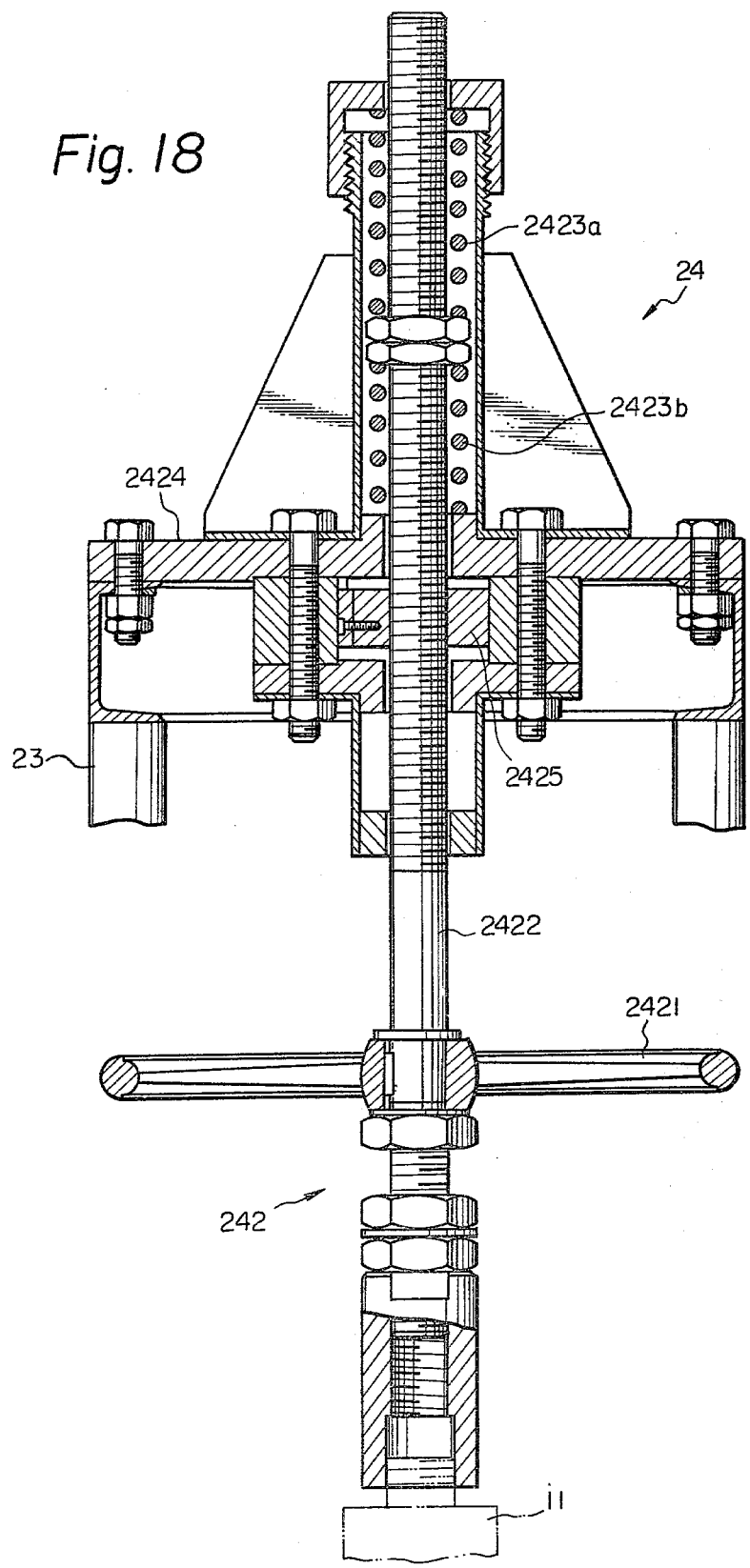
FIG. 18 is a front view of the movable platform taken along the line XVIII—XVIII of FIG. 13.

As best shown in FIG. 18, the movable platform 24 is provided with a chuck 242 so that by operating a handle 2421 thereof the chuck 242 can be caused to grip the top end of the core bar 11 having the preformed reinforcing material thereon and suspend it vertically. A central shaft 2422 of the chuck 242 is supported by a frame 2424 of the movable platform 24 through two series mounted springs 2423a and 2423b. A key block 2425 fixed to the central shaft 2422 for preventing rotation thereof is keyed to the frame 2424.

The series mounted springs 2423a and 2423b serve to generate differences in amplitude and phase of vibration between the core bar 11 and the mold 21 when the vibrating machine is operated and to relieve the shock at the time of approaching the last stage of the pressing step. Spring constants of the series springs 2423a and 2423b are selected depending upon the size of the intended product. Accordingly, these springs are easily replaceably attached. The screws and nuts are preferably provided with locking means.

In operation, the mold 21 into which a predetermined quantity of the liquid synthetic resin has been poured is set on the support plate 233 of the movable vertical support 23 and then the core bar 11 having the preformed reinforcing material thereabout is gripped and suspended vertically by the chuck 242, thus finishing the preliminary stage.

Following the preliminary stage, the electric motor 251 of the upward and downward driving mechanism 25 is actuated to rotate the sprocket 255 in a predetermined direction to thereby move the movable platform 24 downward through the chain 256 until the core bar 11 is inserted into the mold 21.

The vibrating machine 262 is actuated simultaneously with the actuation of the electric motor 251 or after a period of time sufficient to allow a predetermined length of the core bar 11 to be inserted into the mold 21. By the actuation of the vibrating machine 262 the movable vertical support 23 begins to vibrate vertically to thereby vibrate the mold 21. At this time, the core bar 11 is also vibrated, although at a different amplitude and phase from those of the mold 21.

When the core bar 11 has been completely inserted into the mold 21, the electric motor 251 and the vibrating machine 262 are stopped, the chuck 242 is released, and the movable platform 24 is moved upward to the predetermined position to wait for the next core bar to be transferred thereto. The movable platform 24 is moved upward manually, or by a balance weight (not shown), or by reversing the electric motor 251.

Since it is possible to preform a pipe with an end closed according to the present invention as seen from FIGS. 4A and 4B, the preformed molding according to the present invention can be used in producing a light or electric pole without the need to close the end thereof with a cap.

According to the present invention, as is evident from the foregoing description, it is possible to produce reinforced synthetic resin pipes of high quality in a wide range of sizes by relatively simple and economic steps.

While we have shown and described specific embodiments of our invention, it will be understood that these embodiments are merely for the purpose of illustration and description and that various other forms may be devised within the scope of our invention, as defined in the appended claims.

What is claimed is:

1. A method for producing a reinforced synthetic resin pipe, comprising the steps of:
    suspending a core bar vertically;
    winding a reinforcing material therearound for forming a reinforcing preform;
    pouring a predetermined quantity of a hardenable liquid synthetic resin into the mold cavity of a mold for the pipe;
    inserting said core bar into said mold and urging said core bar into said mold while applying vibration to said resin;
    hardening said hardenable synthetic resin into a molding while said core bar remains in said mold;
    stripping said core bar from said mold; and
    where the molding remains on the core bar during stripping, separating said hardened molding from said core bar, and where said molding remains in the mold during the stripping, separating the molding from the mold.

2. A method as claimed in claim 1, in which the vibration is applied to said mold and is longitudinal vibration in the direction of the length of the pipe.

3. A method as claimed in claim 1, in which the vibration is applied to said core bar and is longitudinal vibration in the direction of the length of the core.

4. An apparatus for producing a reinforced synthetic resin pipe, comprising:
    at least one core bar;
    a means for vertically suspending said core bar and winding a reinforcing material about said core bar to form a reinforcing preform for a molding;
    at least one mold having a mold cavity and means for pouring a predetermined quantity of hardenable synthetic liquid resin into said mold cavity;
    a molding mechanism having means for receiving said core bar from the preforming means and receiving said mold from said pouring means, means for inserting said core bar into said mold cavity containing the predetermined quantity of hardenable liquid synthetic resin, means for urging said core bar into said mold, and means for applying vibrations to the hardenable resin in said mold cavity;
    a hardening oven for receiving said mold with said core bar therein and for heating said mold to harden the synthetic resin;
    a stripper for receiving said heated mold and for stripping said core bar from said mold; and a separator for separating the hardened molding from said core bar or said mold.

5. An apparatus as claimed in claim 4, in which said means for forming said reinforcing preform comprises:
a holder for holding said core bar and suspending it vertically;
a rotary driving mechanism connected to said holder for rotating said holder;
a rotary driving mechanism connected to said holder for rotating said holder;
a mechanism connected to said holder for reciprocally moving said holder and said rotary driving mechanism upwardly and downwardly as a unit; and
a feed guide means adjacent the suspended core bar for feeding the reinforcing material to the core bar as it is rotated and moved upwardly and downwardly.

6. An apparatus as claimed in claim 5, in which said core bar has a plurality of rings threadably engaged with the top end thereof for holding the leading and the trailing ends of the reinforcing material and has a projection at the lower end thereof for holding the folded-up ends of the reinforcing material.

7. An apparatus as claimed in claim 4, in which said molding mechanism comprises:
a stationary vertical support;
a movable vertical support movably supported on said stationary vertical support for supporting the mold at the central portion thereof;
a movable platform movably mounted on the upper end of said movable vertical support for holding the core bar and suspending it vertically;
a driving mechanism connected to said movable platform for moving said movable platform upward and downward; and
a vibrating mechanism mounted on said movable vertical support for applying vibration thereto.

8. An apparatus as claimed in claim 7, in which said vibrating mechanism comprises:
a resilient support member for supporting the lower end of said movable vertical support; and
a base plate provided at the lower end of said movable vertical support; and
a vibrating means on said base plate.

9. An apparatus as claimed in claim 7, in which said vibrating mechanism comprises:
a resilient support member for supporting the lower end of said movable vertical support; and
a vibrating means fixed on said movable platform.

10. An apparatus as claimed in claim 7, in which said movable platform has a chuck thereon for gripping the top end of said core bar and suspending it vertically, and said chuck has a central shaft, and a two stage series spring connecting said shaft to said movable platform.

11. An apparatus as set forth in claim 7, in which said means for forming said reinforcing preform comprises:
a holder for holding said core bar and suspending it vertically;
a rotary driving mechanism connected to said holder for rotating said holder;
a mechanism connected to said holder for reciprocally moving said holder and said rotary driving mechanism upwardly and downwardly as a unit; and
a feed guide means adjacent the suspended core bar for feeding the reinforcing material to the core bar as it is rotated and moved upwardly and downwardly; and said holding mechanism comprises:
a stationary vertical support;
a movable vertical support movably supported on said stationary vertical support for supporting the mold at the central portion thereof;
a movable platform movably mounted on the upper end of said movable vertical support for holding the core bar and suspending it vertically;
a driving mechanism connected to said movable platform for moving said movable platform upward and downward; and
a vibrating mechanism mounted on said movable vertical support for applying vibration thereto.

12. A vibrating and pressing machine for producing a reinforced synthetic resin pipe, comprising:
a stationary vertical support;
a movable vertical support movably supported on said stationary vertical support for supporting the mold at the central portion thereof;
a movable platform movably mounted on the upper end of said movable vertical support for holding a core bar and suspending it vertically;
a driving mechanism connected to said movable platform for moving said movable platform upward and downward; and
a vibrating mechanism mounted on said movable vertical support for applying vibration thereto.

13. An apparatus as claimed in claim 12, in which said vibrating mechanism comprises:
a resilient support member for supporting the lower end of said movable vertical support; and
a base plate provided at the lower end of said movable vertical support; and
a vibrating means on said base plate.

14. An apparatus as claimed in claim 12, in which said vibrating mechanism comprises:
a resilient support member for supporting the lower end of said movable vertical support; and
a vibrating means fixed on said movable platform.

15. An apparatus as claimed in claim 12, in which said movable platform has a chuck thereon for gripping the top end of said core bar and suspending it vertically, and said chuck has a central shaft, and a two stage series spring connecting said shaft to said movable platform.

* * * * *